Jan. 23, 1951
R. A. ROAD ET AL
2,538,912
ADJUSTABLE JAW UNIT FOR METER SOCKETS
Filed Jan. 2, 1948
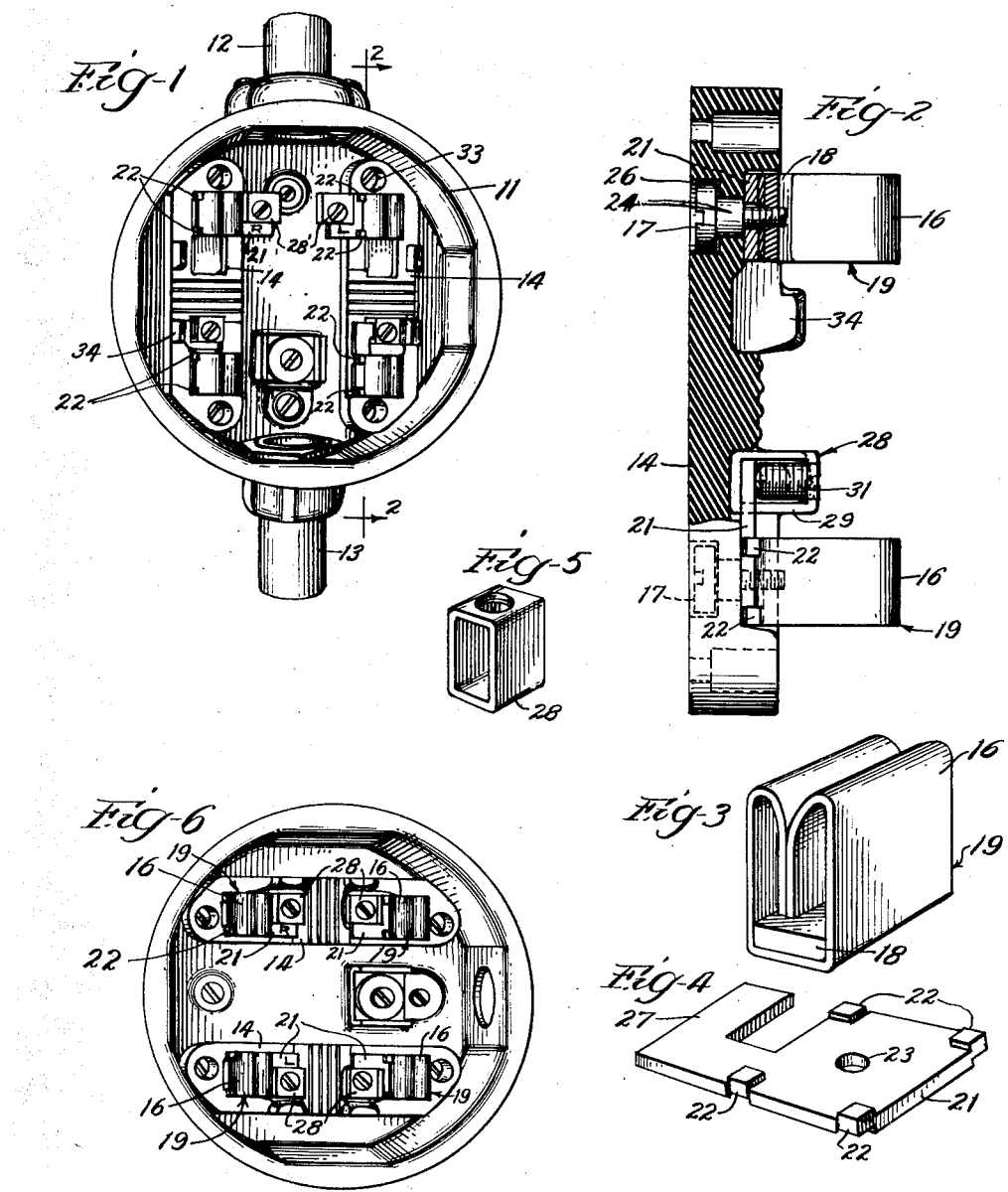
Inventors.
Richard A. Road &
Robert W. Bonnet
By:- Louis Robertson
Atty.

Patented Jan. 23, 1951

2,538,912

UNITED STATES PATENT OFFICE 2,538,912

ADJUSTABLE JAW UNIT FOR METER SOCKETS

Richard A. Road, West Lafayette, and Robert W. Bonnet, La Fayette, Ind., assignors to Duncan Electric Manufacturing Company, La Fayette, Ind., a corporation of Illinois Application January 2, 1948, Serial No. 176

10 Claims. (Cl. 173—328)

Ordinary electric meters, such as those with which everyone is familiar in the home, are called watthour meters. Some watthour meters are of the socket type. These socket meters have the meter mechanism mounted on a base plate with connecting blades extending rearwardly therefrom. These blades are properly connected to the meter mechanism so that the meter can be connected into a circuit by merely thrusting these blades into a suitable socket, to which the base plate is then secured. The present invention relates particularly to the sockets provided for such meters.

There are various very definite requirements for meter sockets. They must meet standardization requirements so that meters of various manufacturers will fit them. This necessarily predetermines the positioning of the jaw units into which the blades of the meter are thrust. These jaws must of course be adequately insulated, adequately supported, and have adequate means for connecting them to the wires of the circuit being measured. In addition, it is highly desirable that the connecting means be adaptable for varying conditions. Sometimes the service wires enter the meter at the top, and the load wires extend from the bottom. At other times, one set of wires extends from one side and the other from the other side. Sometimes service wires extend through one socket, through the terminals therein, to another socket.

Standardization practices tend to require that two of the jaws be mounted on one insulating terminal block and two on another, that these blocks be vertically disposed for one situation and horizontally disposed for another, and that the jaws be vertically disposed in either instance. Heretofore, complicated connector arrangements have been provided for yielding the necessary variations.

The present invention is especially intended to be an improvement over the construction now in common use and illustrated in Patent No. 2,066,300.

According to the present invention, all of the desired variations are provided by a very simple construction. It uses sixteen fewer parts than the conventional construction which it replaces, and eliminates two clamp-type connections for each conductor. All of the connections are dependent solely on metal and are therefore completely dependable, eliminating any danger of a relatively loose connection resulting from cold flow of a plastic layer clamped jointly with the conductors. If a socket which has been assembled for vertical wiring is to be used for horizontal wiring, the jaws may be turned ninety degrees with respect to the terminal blocks merely by loosening one screw for each jaw unit. If a bus line or straight-through connection is desired, it is merely necessary to remove the same screw for each of two jaw units, interchange the associated connector plates, and re-insert the screws.

Additional objects and advantages of the invention will be apparent from the following description and from the drawings in which:

Figure 1 is a perspective view of a socket chosen for illustration of this invention and arranged for vertical wiring.

Fig. 2 is a sectional view taken on an enlarged scale through the terminal block approximately on the line 2—2 of Fig. 1.

Fig. 3 is a perspective view of a jaw unit.

Fig. 4 is a perspective view of a connector plate.

Fig. 5 is a perspective view of a terminal ring.

Fig. 6 is a perspective view of the socket of Fig. 1 rearranged for horizontal wiring.

Although the law requires a full and exact description of at least one form of the invention, such as that which follows, it is, of course, the purpose of a patent to cover each new inventive concept therein no matter how it may later be disguised by variations in form or additions of further improvements; and the appended claims are intended to acomplish this purpose by particularly pointing out the parts, improvements or combinations in which the inventive concepts are found.

The form of the invention chosen for illustration is used in conjunction with a socket 11 which may be secured to a conduit 12 for incoming service wires and to a conduit 13 for load or outgoing service wires.

In Fig. 1 the socket has been shown as arranged for vertical wiring, as is readily apparent from the fact that the terminal blocks 14 of insulating material are shown vertically disposed. In Fig. 6 the socket 11 has been shown arranged for horizontal wiring as is evident from the fact that the terminal blocks 14 are horizontally disposed. It will be observed that in each instance the jaws 16 are vertically disposed. The terminal blades on the back of the watthour meter are conventionally disposed in vertical planes and hence the jaws 16 must also be vertically disposed to receive these blades. An important feature of the invention is in the ready adaptability of the socket to change it from the arrangement for vertical wiring to the arrangement for horizontal wiring. Such changes have been possible with terminal blocks of the past, but not with very great simplicity.

According to the present invention, it is merely necessary to loosen a screw 17, seen best in Fig. 2, in order to be able to turn the jaws 16 ninety degrees so that the terminal block 14 may be horizontally disposed instead of vertically disposed, as shown in Fig. 2.

The jaws 16 are formed from one piece of metal, the shape being adequately indicated in Fig. 3. A nut 18 is fitted within the jaws and together with the jaws may be said to form a jaw unit 19. The jaw unit 19 rests on a connector or connector plate 21. This plate is preferably provided with four upwardly coined lugs 22. These are so positioned that the jaw unit 19 may nest between them in either of two positions displaced at ninety degrees.

Screw 17 passes through a hole 23 in connector 21, through a hole in the base of jaws 16, and is threaded into jaw nut 18. The screw head 24 then bears on the connector 21 so that the connector 21 is tightly clamped to the jaw unit 19 with a dependable metal-to-metal construction. The screw head 24 is the smaller portion of a stepped head. The larger portion 26 retains the entire terminal assembly properly positioned on the terminal block 14. The enlarged heads 26 should have a slight clearance with the terminal block 14, however, so that in tightening the screw 17 it will always tighten connector 21 firmly against jaw unit 19.

It is apparent therefore that by loosening screw 17 the jaw unit 19 may be turned ninety degrees, whereupon the screw 17 may be tightened and accidental misalignment of the jaw unit 19 will be prevented by lugs 22.

According to present practice, meter sockets are normally shipped for vertical arrangement, but not with the arrangement shown in Fig. 1. Instead, all of the connectors 21 are positioned as shown in Fig. 6 with their terminal arms 27 lying along and crosswise of the terminal block 14. The arm 27 is provided for receiving a terminal clamp 28 which comprises a terminal ring 29 and a terminal screw 31. The arrangement shown in Fig. 1 is desired for certain types of connections known as bus line wiring. It could also be called straight-through wiring in that certain wires pass through the bus line terminals 28' and extend on to at least one other additional meter. To provide the arrangement shown in Fig. 1, when starting with a normal vertical arrangement, it is merely necessary to interchange the two upper connectors 21. This is easily done by removing both of the upper screws 17. By reference to Fig. 6 it is seen that the connector 21 at the upper left corner, on which the letter "R" has been added in the drawings, has the arm on which terminal 28 is mounted extending in the counterclockwise direction, while the connector 21 below it, bearing letter "L," has the arm bearing terminal clamp 28 extending in a clockwise direction. Referring to the upper half of Fig. 1, it will be seen that these two connectors 21 have been interchanged, the one bearing "R" being on the left, and that bearing "L" being on the right.

It should be mentioned that the connector 21 is rectangular and fits fairly snugly in a recess in the terminal block so that once the screw 17 is tightened the connector will not turn objectionably with respect to the terminal block.

The terminal blocks are each secured to the socket 11 by two screws 33 which are removable for giving access to the screws 17. Customarily the terminal blocks are further insulated from the socket by sheets of paper-like insulating material secured beneath them but not clearly shown in the drawings.

To guard against extending wires too far through the terminal clamps 28 so that the wires would approach too closely to the socket 11, lugs 34 of insulating material are formed on the insulating blocks 14.

The insulating blocks may be formed of any suitable insulating material. Bakelite has been used for such blocks in the past, but it is preferred that a material less subject to tracking or surface carbonization by an electric current be used. One such material which can be used is porcelain; another is that generally known as "Rosite."

The lugs 22 may be formed with steep walls without rupture of the metal by a coining process, using a press heavy enough to make the copper flow. They could also be formed by an ordinary punch press, in which case the lugs 22 might be formed as tongues. In that event the steep, cut faces would be disposed where they would do the most good in positioning the jaw units 19.

We claim:

1. A connecting device for use in wall sockets including a terminal block of insulating material, a jaw unit for engaging a plug-in blade of electrical apparatus to be mounted on the socket, a connecting plate, a step-headed screw, with the rear part of larger diameter than the advanced part, passing through the terminal block and through the connecting plate and threaded into the jaw unit, the smaller part of the stepped head clamping the plate to the jaw unit and the larger part of the stepped head holding the jaw unit and plate on the terminal block but without clamping the terminal block; said connecting plate having lugs formed thereon adapted, with the connecting plate in one position, to confine the jaw piece selectively in either of two positions displaced angularly at ninety degrees with respect to one another about the axis of the screw, and having a notch separating one part of the plate from the lugged part to form an arm adapted to receive a terminal clamp.

2. A connecting device for use in wall sockets including a terminal block of insulating material, a jaw unit for engaging a plug-in blade of electrical apparatus to be mounted on the socket, a connecting plate, a step-headed screw, with the rear part of larger diameter than the advanced part, passing through the terminal block and through the connecting plate and threaded into the jaw unit, the smaller part of the stepped head clamping the plate to the jaw unit and the larger part of the stepped head holding the jaw unit and plate on the terminal block but without clamping the terminal block; said connecting plate having lugs formed thereon adapted, with the connecting plate in one position, to confine the jaw piece selectively in either of two positions displaced angularly at ninety degrees with respect to one another about the axis of the screw, and having a notch separating one part of the plate from the lugged part to form an arm adapted to receive a terminal clamp, said lugged part being approximately square, and said arm being offset directly from one side thereof, and said block having a formation adapted to restrain said plate against turning when said screw is tightened.

3. A connecting device for use in wall sockets including a terminal block of insulating material, a jaw unit for engaging a plug-in blade of electrical apparatus to be mounted on the socket, a connecting plate, a step-headed screw, with the rear part of larger diameter than the advanced part, passing through the terminal block and through the connecting plate and threaded into the jaw unit, the smaller part of the stepped head clamping the plate to the jaw unit and the larger part of the stepped head holding the jaw unit and plate on the terminal block but without clamping the terminal block; said connecting plate having lugs formed thereon adapted, with the connecting plate in one position, to confine the jaw piece selectively in either of two positions displaced angularly at ninety degrees with respect to one another about the axis of the screw, and having a notch separating one part of the plate from the lugged part to form an arm adapted to receive a terminal clamp, said lugged part being approximately square, and said arm being offset directly from one side thereof, and said block having a formation adapted to restrain said plate against turning when said screw is tightened with said plate in either of two positions at right angles to one another.

4. A connecting device for use in wall sockets including a terminal block of insulating material, a jaw unit for engaging a plug-in blade of electrical apparatus to be mounted on the socket, a connecting plate, a step-headed screw, with the rear part of larger diameter than the advanced part, passing through the terminal block and through the connecting plate and threaded into the jaw unit, the smaller part of the stepped head clamping the plate to the jaw unit and the larger part of the stepped head holding the jaw unit and plate on the terminal block but without clamping the terminal block; said connecting plate having lugs formed thereon adapted, with the connecting plate in one position, to confine the jaw piece selectively in either of two positions displaced angularly at ninety degrees with respect to one another about the axis of the screw, and having a notch separating one part of the plate adapted to receive a terminal clamp, the terminal block having a formation adapted to restrain said plate against turning when said screw is tightened.

5. A connecting device for use in wall sockets including a pair of spaced terminal blocks of insulating material, a jaw unit on each block for engaging a plug-in blade of electrical apparatus to be mounted on the socket, a connecting plate for each jaw unit, step-headed screws, with the rear part of larger diameter than the advanced part, passing through the terminal blocks and through connecting plates and threaded into the jaw units, the smaller part of each stepped head clamping the plate to the jaw unit and the larger part of the stepped head holding the jaw unit and plate onto the terminal block but without clamping the terminal block, said terminal blocks each having formations shaped to receive one of said plates with one angularity of disposition and to receive the other of said plates with a substantially different angularity of disposition and to restrain each against turning when so received, said plates being non-symmetrical and each reversely shaped with respect to the other whereby different connecting arrangements may be provided by interchanging said plates and disposing them at different angularities.

6. A connecting device for use in wall sockets including a pair of spaced terminal blocks of insulating material, a jaw unit on each block for engaging a plug-in blade of electrical apparatus to be mounted on the socket, a connecting plate for each jaw unit, step-headed screws, with the rear part of larger diameter than the advanced part, passing through the terminal blocks and through the connecting plates and threaded into the jaw units, the smaller part of each stepped head clamping the plate to the jaw unit and the larger part of the stepped head holding the jaw unit and plate onto the terminal block but without clamping the terminal block; said terminal blocks each having formations shaped to receive one of said plates with one angularity of disposition and to receive the other of said plates with a substantially different angularity of disposition and to restrain each against turning when so received, said plates being non-symmetrical and one having a terminal arm extending clockwise and the other having a terminal arm extending counter-clockwise whereby different connecting arrangements may be provided by interchanging said plates and disposing them at different angularities.

7. A connecting device for use in wall sockets including a pair of spaced terminal blocks of insulating material, a jaw unit on each block for engaging a plug-in blade of electrical apparatus to be mounted on the socket, a connecting plate for each jaw unit, step-headed screws, with the rear part of larger diameter than the advanced part, passing through the terminal blocks and through the connecting plates and threaded into the jaws units, the smaller part of each stepped head clamping the plate to the jaw unit and the larger part of the stepped head holding the jaw unit and plate onto the terminal block but without clamping the terminal block; said terminal blocks each having formations shaped to receive one of said plates with one angularity of disposition and to receive the other of said plates with a substantially different angularity of disposition and to restrain each against turning when so received, said plates being non-symmetrical and one having a terminal arm extending clockwise and the other having a terminal arm extending counter-clockwise, said terminal arms lying between the blocks when the plates are disposed with one of said angularities whereby different connecting arrangements may be provided by interchanging said plates and disposing them at different angularities.

8. A connecting device for use in wall sockets including a terminal block of insulating material, a jaw unit for engaging a plug-in blade of electrical apparatus to be mounted on the socket, a connecting plate, and a step-headed screw, with the rear part of larger diameter than the advanced part, passing through the terminal block and through the connecting plate and threaded into the jaw unit, the smaller part of the stepped head clamping the plate to the jaw unit and the larger part of the stepped head holding the jaw unit and plate on the terminal block but without clamping the terminal block.

9. A connecting device for use in wall sockets including a terminal block of insulating material, a jaw unit for engaging a plug-in blade of electrical apparatus to be mounted on the socket, a connecting plate, and a step-headed screw, with the rear part of larger diameter than the advanced part, passing through the terminal block and through the connecting plate and threaded into the jaw unit, the smaller part of the stepped head clamping the plate to the jaw unit and the larger part of the stepped head holding the jaw unit and plate on the terminal block but without clamping the terminal block, and said terminal block having formations restraining said plate and jaw unit from turning.

10. A connecting device for use in wall sockets including a terminal block of insulating material, a jaw unit for engaging a plug-in blade of electrical apparatus to be mounted on the socket, a connecting plate, a screw passing through the terminal block and through the connecting plate and threaded into the jaw unit, clamping the plate to the jaw unit and holding the jaw unit and plate on the terminal block; said connecting plate having lugs formed thereon adapted, with the connecting plate in one position, to confine the jaw piece selectively in either of two positions displaced angularly at ninety degrees with respect to one another about the axis of the screw, and having a notch separating one part of the plate from the lugged part to form an arm extending approximately parallel to the nearest side of the jaw piece and adapted to receive a terminal clamp.

RICHARD A. ROAD.
ROBERT W. BONNET.

REFERENCES CITED

The following references are of record in the file of this patent:

UNITED STATES PATENTS

| Number | Name | Date |
|---|---|---|
| 231,588 | Kernochan | Aug. 24, 1880 |
| 966,139 | Thordarson | Aug. 2, 1910 |
| 1,498,091 | Getchell | June 17, 1924 |
| 1,498,146 | Benjamin | June 17, 1924 |
| 1,860,668 | Gillet | May 31, 1932 |
| 2,015,112 | Johansson | Sept. 24, 1935 |
| 2,066,299 | Mylius | Dec. 29, 1936 |
| 2,066,300 | Mylius | Dec. 29, 1936 |
| 2,086,727 | Morris | July 13, 1937 |
| 2,145,557 | Rypinski | Jan. 31, 1939 |
| 2,230,737 | Wilde | Feb. 4, 1941 |
| 2,232,602 | Grace | Feb. 18, 1941 |
| 2,371,446 | Jensen | Mar. 13, 1945 |
| 2,374,971 | Benander | May 1, 1945 |